United States Patent
Loh et al.

(10) Patent No.: US 9,524,141 B2
(45) Date of Patent: Dec. 20, 2016

(54) SYSTEM AND METHOD FOR AUDIO PASS-THROUGH THAT HAS AT LEAST TWO USB PORTS BETWEEN MULTIPLE HOST COMPUTING DEVICES

(71) Applicant: iKingdom Corp., Calgary (CA)

(72) Inventors: Michael Loh, Calgary (CA); Edmund Geeraert, Calgary (CA); Demetrio Navarro, Calgary (CA); Scott Juskiw, Calgary (CA)

(73) Assignee: iKingdom Corp., Calgary, AB (CA)

( * ) Notice: Subject to any disclaimer, the term of this patent is extended or adjusted under 35 U.S.C. 154(b) by 308 days.

(21) Appl. No.: 14/137,934

(22) Filed: Dec. 20, 2013

(65) Prior Publication Data
US 2014/0181338 A1 Jun. 26, 2014

Related U.S. Application Data

(60) Provisional application No. 61/745,230, filed on Dec. 21, 2012.

(51) Int. Cl.
*G06F 3/00* (2006.01)
*G06F 3/16* (2006.01)
(Continued)

(52) U.S. Cl.
CPC .............. *G06F 3/162* (2013.01); *G06F 3/165* (2013.01); *G06F 21/00* (2013.01); *G10H 1/00* (2013.01); *G10H 1/0025* (2013.01); *G10H 1/46* (2013.01); *H04H 60/04* (2013.01); *G10H 2210/125* (2013.01); *G10H 2240/026* (2013.01); *G10H 2240/285* (2013.01); *G10H 2240/305* (2013.01); *G10H 2240/325* (2013.01); *G10H 2250/035* (2013.01); *G10H 2250/571* (2013.01); *G10H 2250/631* (2013.01); *G10H 2250/641* (2013.01)

(58) Field of Classification Search
CPC ....................................................... G06F 3/162
USPC .............................. 710/2, 8–10, 62, 73, 300
See application file for complete search history.

(56) References Cited

U.S. PATENT DOCUMENTS 5,983,280 A 11/1999 Hunt
6,342,666 B1 1/2002 Shutoh
(Continued)

FOREIGN PATENT DOCUMENTS

AU 2012101757 1/2013
EP 2634724 11/2012
WO 00/60901 10/2000

OTHER PUBLICATIONS

"C3USB Five Channel Mobile DJ Mixer with USB", Numark, URL:https://web.archive.org/web/20120123095042/http://www.numark.com/product/c3usb, Jan. 23, 2012.
(Continued)

*Primary Examiner* — Tammara Peyton
(74) *Attorney, Agent, or Firm* — Fish & Tsang LLP (57) ABSTRACT

A digital audio pass-through device capable of connecting multiple host computing devices is described. The digital audio pass-through device allows computing devices such as personal computers (Mac or PC), tablets, and smart phones to share high quality digital audio data streams with one another via USB connections. The digital audio pass-through device also allows for the aggregation of high quality audio data from multiple computing devices with limited to no latency.

18 Claims, 4 Drawing Sheets

(51) Int. Cl.
*G10H 1/00* (2006.01)
*G06F 21/00* (2013.01)
*G10H 1/46* (2006.01)
*H04H 60/04* (2008.01)

(56) References Cited

U.S. PATENT DOCUMENTS

| | | | |
|---|---|---|---|
| 7,531,737 B2 | 5/2009 | Ide et al. | |
| 7,786,371 B1 | 8/2010 | Moates | |
| 8,117,039 B2* | 2/2012 | Wang et al. | 704/501 |
| 8,478,913 B2 | 7/2013 | Telizzi et al. | |
| 8,769,172 B2* | 7/2014 | Soffer et al. | 710/64 |
| 2002/0097220 A1* | 7/2002 | Ferguson et al. | 345/156 |
| 2004/0074377 A1 | 4/2004 | Georges | |
| 2006/0180008 A1 | 8/2006 | Negoescu et al. | |
| 2007/0263473 A1* | 11/2007 | Raines | 365/230.05 |
| 2007/0276978 A1 | 11/2007 | Wang et al. | |
| 2009/0198848 A1 | 8/2009 | Chien | |
| 2009/0277321 A1 | 11/2009 | Sturch | |
| 2013/0238823 A1 | 9/2013 | Terlizzi et al. | |

OTHER PUBLICATIONS

"USB MIDI User's Guide for Windows", Mark of the Unicorn, Inc., 2000.
"MIDI Express XT, MIDID Express 128, micro express, micro lite—User Guide", Mark of the Unicorn, Inc., 2003.
"MSB Plus Rev 2—Owners Manual, 7th Edition", JLCooper Electronics, 1997.
"UM-3EX Owner's Manual", Edirol by Roland, 2005.

* cited by examiner

SYSTEM AND METHOD FOR AUDIO PASS-THROUGH THAT HAS AT LEAST TWO USB PORTS BETWEEN MULTIPLE HOST COMPUTING DEVICES

This application claims the benefit of priority to provisional application Ser. No. 61/745,230 filed on Dec. 21, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is digital audio pass-through devices and processes.

BACKGROUND

The following description includes information that may be useful in understanding the present invention. It is not an admission that any of the information provided herein is prior art or relevant to the presently claimed invention, or that any publication specifically or implicitly referenced is prior art.

Currently, hosting computing devices such as Mac and PC desktop computers, laptops, tablets, and smart phones use digital protocols to communicate audio between the computing device and an associated audio interface device (e.g., Speakers, Microphones, Headsets, Audio Interfaces, Synthesizers, Mixers, Effects and Converters). Often this is done using USB communication protocols.

Figure 2:
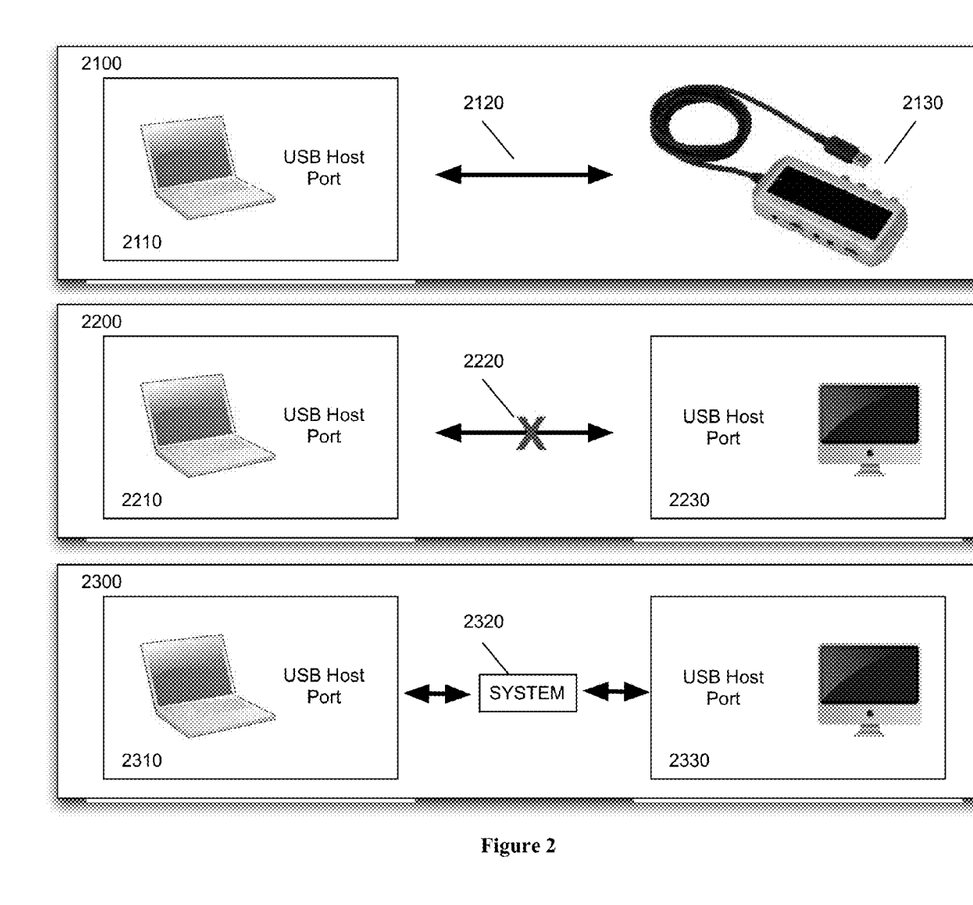
FIG. 2 is a schematic comparing a master-slave relationship scenario 2100, a multi-host scenario 2200, and an audio pass-through solution scenario 2300.

USB communication protocols have a master-slave relationship in which the computing device is designated as the "host" or "master" of the communications to the associated audio interface device (i.e., the peripheral device). FIG. 2 illustrates a master-slave relationship scenario 2100 in which a host computing device 2110 is communicatively coupled with a peripheral device 2130 via a USB connection 2120. USB connection 2120 typically comprises a USB cable that has a USB type A end and a peripheral USB type B end. The USB type A end plugs into a USB host port on a computing device 2110 and the peripheral USB type B end plugs into a port or is directly wired on the peripheral device 2130. Device 2100 and device 2130 can exchange digital audio data via USB connection 2120; however, only device 2110 can act as the "master" of communications, meaning that communications are controlled exclusively by the device 2110.

FIG. 2 also illustrates a multi-host scenario 2200 in which a first host computing device 2210 tries to communicatively couple with a second host computing device 2230 via a USB connection 2220. In this scenario, USB connection 2220 would comprise a USB cable having a first USB type A end and a second USB type A end. Unfortunately, it is not currently possible to connect device 2210 with device 2230 via USB connection 2220 in a multi-host configuration since USB communication protocols are limited to only master-slave relationships. As a result, only one host computing device can control communications between the devices. At the present time, it is not possible for two host computing devices to connect directly to each other to share digital audio data over a USB connection.

It would be advantageous to provide a device or process that solves the problem illustrated by multi-hosting scenario 2200. More specifically, it would be advantageous to provide a device or process in which two or more host computing devices can share digital audio data over a USB connection and/or USB communication protocol. FIG. 2 illustrates an audio pass-through solution scenario 2300 in which a system 2320 is communicatively coupled with a first host computing device 2310 and a second computing device 2330 via two USB connections. System 2320 is configured in a manner that allows devices 2310 and 2330 to share digital audio data via the USB connection in a multi-host configuration.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for devices and processes that allow two or more host computing devices to share digital audio signals via a USB connection and/or USB communication protocol.

SUMMARY OF THE INVENTION

The inventive subject matter provides apparatus, systems and methods in which an audio pass through device has at least two USB ports for communicatively coupling with two or more host computing devices. As used herein, "host computing device" simply means a device that hosts digital audio data. The host computing device may include devices that have digital audio data stored therein. The host computing device could also include devices that generate new digital audio data, or modify existing digital audio data to produce new (e.g., modified, synthesized, etc.) digital audio data. Examples of host computing devices can include, but are not limited to, desktop computers (e.g., MAC, PC), laptops, tablets, smart phones, or other handheld or embedded computing devices.

The audio pass-through device acts as the go-between for two or more host computing devices to pass-through the desired communications while optimizing the data transfer between the host computing devices. In this manner, the two or more host computing devices can share digital audio and video data without the need for converting the digital data to and from analog data. As a result, latency is reduced and data quality is greatly improved over state of the art devices, systems, and processes.

In one aspect of some embodiments, the audio pass-through device includes a high speed digital audio gateway engine. The gateway engine is responsible for managing, monitoring, controlling, configuring, directing, or otherwise facilitating the sharing of digital audio data among different devices. In some embodiments, the gateway engine may comprise a combination of hardware components (e.g., non-transitory electronic storage mediums, processors, buses, circuits, etc.) and/or executable instructions (e.g., software code, firmware code, etc.) that is configured to perform various functions. The various functions of the gateway engine are described herein as modules. As used herein, "modules" means subset of hardware components and/or software components configured to perform a specific function.

In another aspect of some embodiments, the gateway engine can include a sample rate module that is responsible for (i) detecting sample rates of incoming digital audio data, and (ii) converting the sample rate digital audio data when required by an output device. The gateway engine may also include a bit depth module that functions similar to the sample rate module but for bit depth detection and translation.

In yet other aspects of some embodiments, the gateway engine can also include a matrix mixer module capable of applying a level from 0-100% to each digital audio data input to thereby produce a digital audio data output comprising an aggregation or summation of various inputs.

The gateway engine may also include a digital rights management (DRM) module that (i) detects a digital right associated with digital audio data and (ii) applies a rule to the digital audio data (e.g., do not share the data with a particular device, modify the data before sharing, etc.).

In another aspect of some embodiments, the audio pass-through device can include additional types of ports, interfaces, and protocols other than the USB ports ad USB communication protocols, for communicatively coupling with additional devices. For example, the audio pass-through device could include Ethernet ports (including Audio Video Bridging protocol), USB Hosts to host USB hubs and one or more USB devices, analogue audio or video jacks (e.g.. ¼", XLR or RCA) with conversion CODECs, DVI, HDMI, VGA, DFP, S-Video, TRS, coaxial, F connector, Mini DVI, proprietary interfaces/protocols, and even after-arising interfaces and technologies. The embodiment can also be applied to other hosting connections such as Thunderbolt, Lightning and other master-slave protocols.

From a methods perspective, the inventive subject matter provides a process for sharing digital audio data between two or more host computing devices via a USB connection, comprising the steps of: receiving a first digital audio data from a first host computing device via a first USB connection; receiving a second digital audio data from a second host computing device via a second USB connection; detecting a sample rate and a bit depth for each of the first and second digital audio data; converting the sample rate and bit depth of the first digital audio data to match the sample rate and bit depth of the second digit audio data, respectively, when the sample rate and bit rate of the first digital audio data are different than the sample rate and bit rate of the second digital audio data, respectively; determining a digital rights attribute associated with the first digital audio data; applying a digital rights management rule to the first digital audio data according to the digital rights attribute; sending the first digital audio data to the second host computing device when there is no conflict with a digital rights management rule.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should appreciate that the inventive subject matter described herein provides various technical effects, such as devices and processes for sharing digital audio data between multiple host computing devices via multiple USB connections.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
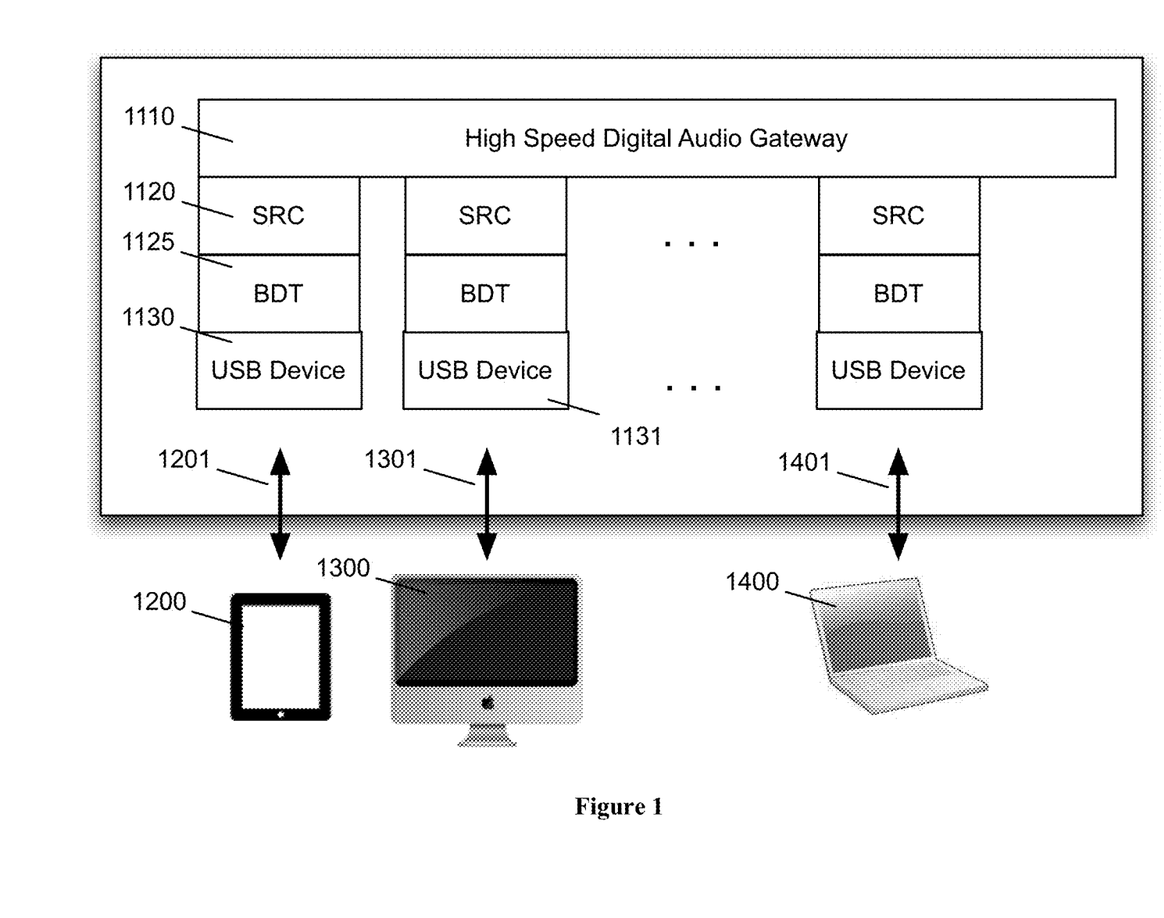
FIG. 1 is a schematic of a digital audio pass-through device 1000 connected with multiple host computing devices.

FIG. 1 shows a schematic of an audio pass-through device 1100. Device 1100 has a first USB port 1130 and a second USB port 1131 for communicatively coupling with a first host computing device 1200 and a second host computing device 1300, respectively. In this particular instance, device 1200 is a tablet and device 1300 is a desktop computer. However, it is contemplated that audio pass-through device 1100 could have any number of USB ports for connecting with any number of host computing devices (e.g., laptop 1400, etc.).

Device 1100 receives a first digital audio data stream from device 1200 via first USB port 1130 and USB connection 1201. Device 1100 also receives a second digital audio signal from device 1300 via second USB port 1131 and USB connection 1301. As used herein, USB connection means an electronic communication link that uses a USB communication protocol and/or a physical USB port. The first and second digital audio data streams are digital data that represents sound signals. In some embodiments, the digital audio data streams represent songs, voice recordings, instrumental recordings, synthesized beats, and other audible audio signals that can be used to create music. However, it is also contemplated that the digital audio data could represent non-audible audio signals, for applications other than making music (e.g., ultrasound analysis, operating medical instrumentations, etc.).

Device 1100 has a high speed digital audio gateway engine 1110 for managing and directing the sharing of digital audio data streams between different devices. Gateway engine 1110 can comprise a processor(s), non-transitory electronic storage medium(s), and executable code configured to perform various functions. In some embodiments, the gateway engine comprises mini-processor chips, memory chips, and firmware. The firmware has various modules (e.g., subsets of executable code) that are dedicated to performing various functions. Some of the modules will now be described.

Sample Rate Conversion (SRC) module 1120 is configured to determine/detect the sample rate of input data streams (e.g., first and second digital audio data streams), and convert the sample rate of input data streams to match the sample rate requirements of an output device and/or the sample rate of an input data stream of an output device. "Output device" as used herein refers to a device that receives a digital audio data stream from the gateway engine 1110. Since each of the host computing devices connected to audio pass-through device 1100 are potentially capable of sending and receiving digital audio data streams to and from device 1110, the host computing devices can be referred to as "input devices" and "output devices," depending on the application and data transport state (e.g., sending vs. receiving). As used herein, "sample rate" is the rate at which the analog signal of audio is sampled or captured for digital conversion. Generally the higher the sample rate, the better the quality of audio. Typical sample rates are 44.1 kS/s, 48 kS/s and 96 kS/s although other rates do exist. Not all host computers though are capable of supporting the same sample rates or may have other limitations on sample rates available. Therefore, for more than one computing device to share the same digital audio stream, sample rate conversion would be required.

Bit Depth Translation (BDT) module 1125 is configured to determine/detect the bit depth of input data streams (e.g., first and second digital audio data streams), and convert the bit depth of input data streams to match the bit depth requirements of an output device and/or the bit depth of an input data stream of an output device. Bit depth, like sample rate, is another audio property. Typical bit depths include 16 bits, 24 bits and 32 bits. Bit depth is easily managed and does not require special resources. However, it may be necessary to translate the bit depth of a digital audio data steam to make it compatible with an output device.

The functions of SRC module 1120 and BDT module 1125 can be executed in various ways without departing from the inventive principles. For example, in some embodiments BDT module 1125 may convert an input data stream at the USB port (e.g., USB port 1130 or 1131). In other embodiments, BDT module 1125 may convert an input data stream when SRC module 1120 converts the sample rate. In yet other embodiments, BDT module 1125 can operate at gateway engine 1110. In addition, various processes for translating bit depth are known, such as truncating from 24 bits to 16 bits, or applying noise dithering to translate from 16 bit to 24 bit. All known devices, processes, and technologies for converting sample rates and bit depths of digital audio data are contemplated herein.

In addition to SRC module 1120 and BDT module 1125, gateway engine 1110 could include other modules that are capable of determining the properties of an input digital audio data stream and converting those properties into a value that is compatible with an output device and/or output device's input digital audio data stream.

Figure 4:
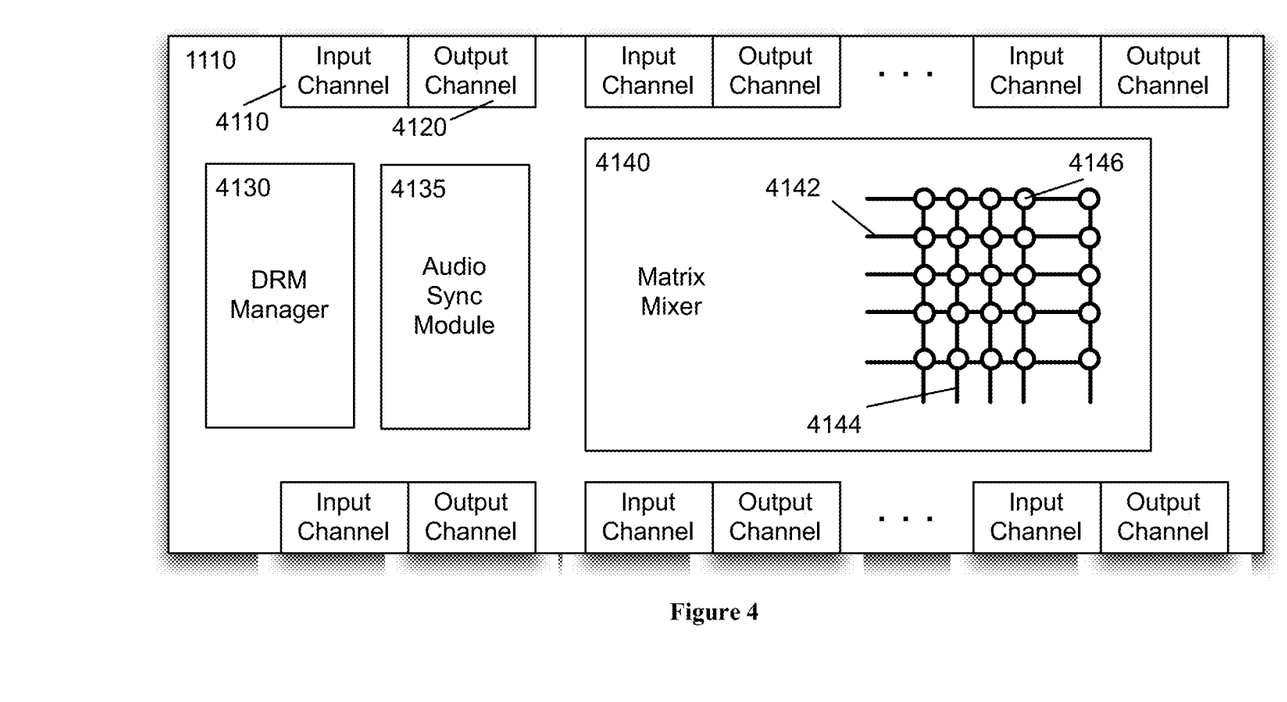
FIG. 4 is a schematic of the high speed digital audio gateway engine 1110 of FIG. 1.

FIG. 4 shows a more detailed schematic of gateway engine 1110. Engine 1110 has an audio sync module 4135 that is configured to synchronize audio signals from the plurality of input channels 4110 (e.g., the different audio signals from devices 1200, 1300, 1400, 3200, 3300, 3400, 3500, etc.). In some embodiments, sync module 4135 synchronizes the first and second digital audio data streams from host computing devices 1200 and 1300 by the sample rate of one or both of the data streams. However, other digital audio synchronization processes can be used consistently with the inventive subject matter.

Digital Rights Management (DRM) module 4130 is configured to determine a digital right attribute associated with a digital audio data stream. The digital rights attribute can represent a restriction on how the digital audio data stream can be used, stored, reproduced, or modified. DRM module 4130 may also include a library or database of rules for handling the use of a digital audio data steam based on the digital rights attribute. For example, DRM module 4130 may prevent an input digital audio data stream from being passed on to an output device. In another case, DRM module 4130 may require that the input digital audio data stream be further modified (e.g., aggregated with another input signal) before passing the input digital audio data stream to an output device. Various DRM devices and processes are known and can be incorporated into gateway engine 1110.

Matrix mixer module 4140 serves as a level controller between all input channels 4110 and output channels 4120. Each of the input channels 4110 is represented by inputs 4142 in matrix mixer 4140, whereas each output channel 4120 is represented by outputs 4144 in matrix mixer 4140. Each digital level node 4146, which represents a relationship between a specific input and a specific output, is controllable to allow from 0% to 100% of the corresponding input signal onto the output signal. This allows the output channel to be either a pass-through of an audio input channel, by having only one input channel at 100% or a mix of several input channels by having the corresponding nodes with a value 0<Nlevel<=100. The grid configuration of matrix mixer module 4140 and the ability to set a different level for each node 4146 allows each output channel to have a unique and different relationship with each input channel. For example, a first output channel could receive a 100% pass-through of the first input channel while a second output channel receives a 50% pass-through of the first input channel and a third output channel receives a 0% pass-through of the first input channel.

Matrix mixer module 4140 permits the combining of multiple input channels to a single output channel or a single input channel to be copied to multiple output channels in a controlled manner as well as the pass-through of a single input channel to a single output channel.

Figure 3:
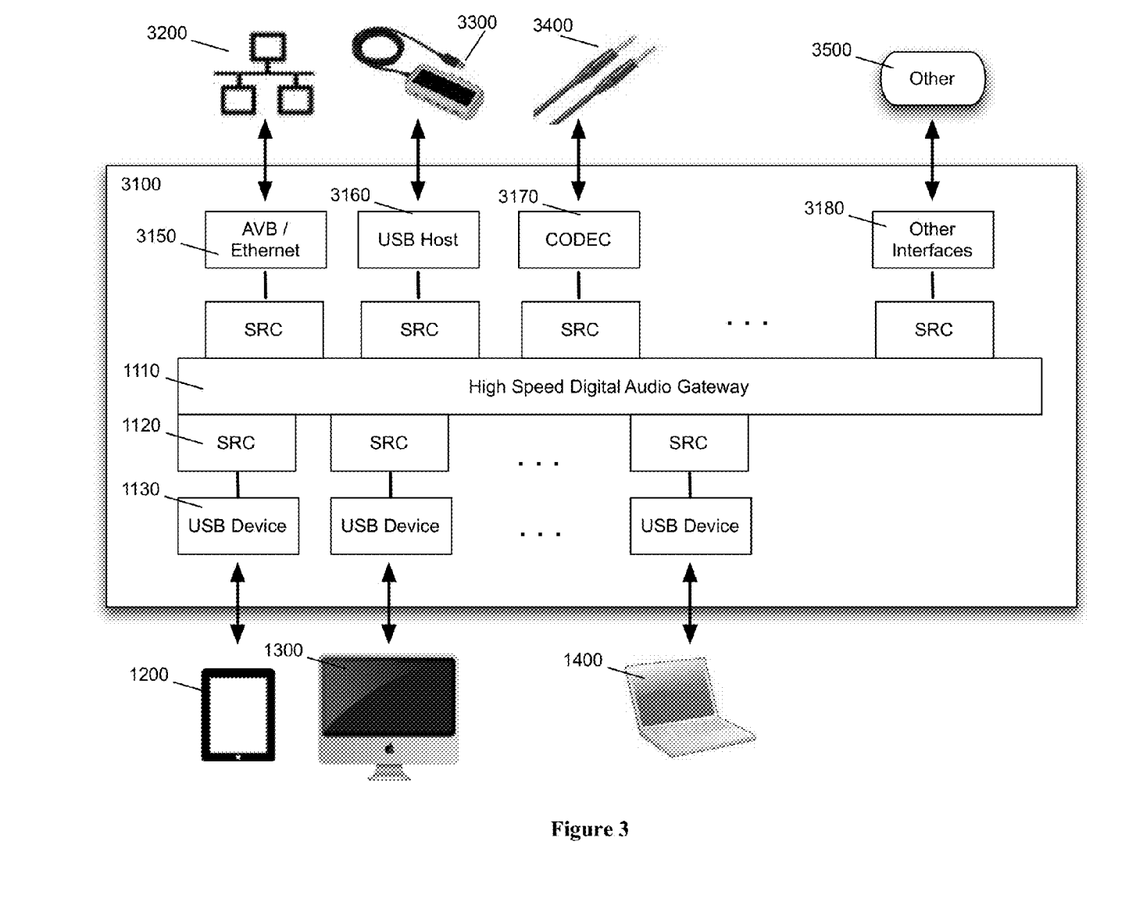
FIG. 3 is a schematic of another embodiment of a digital audio pass-through device 3000.

FIG. 3 shows a digital audio pass-through device 3100. Device 3100 is similar to device 1100 except that it has non-USB device ports and interfaces. The non-USB device ports provide the digital audio pass-through functionally in combination with other audio input sources other than from a host computing device. Some examples include, but are not limited to: Ethernet connected computers and devices 3200 including use of new protocols such as Audio Video Bridging (AVB) 3150 for real-time low latency audio; USB audio interfaces and devices 3300 through USB Host port 3160 or a USB Hub connected to the USB host port for multiple USB Audio devices; and using direct Audio to Digital (ADC) and Digital to Audio (DAC) conversion CODECs 3170 for traditional analog audio inputs and outputs 3400. Device 3100 could also include proprietary, new and/or less common audio interfaces and interface protocols 3180/3500.

Device 3100 allows the sharing of audio data between multiple computing devices using multiple types of interfaces and ports. For example, the audio data coming in through devices 3200, 3300, 3400 and 3500 can be shared and made available simultaneously to devices 1200, 1300, and 1400. In some embodiments, audio patching and mixing is controlled by MIDI communication protocol and System Exclusive (SYSEC) messages. This allows a user to configure mixing and patching settings from a host computing device (e.g., device 1200 and/or 1300) via a graphical user interface provided by an app or software application running on the host computing device.

While the digital data pass-through devices described herein are presented in the context of sharing audio data, the inventive principles could also be applied to other types of digital data and protocols such as digital video, Digital MultipleX (i.e., DMX, a protocol for lighting control), and Musical Instrument Digital Interface (MIDI).

From a methods perspective, device 1110 performs various steps that are unique in this field. Device 1110 enables a process of sharing a digital audio signal between multiple host computing devices across a USB connection, by: receiving a first digital audio data from a first host computing device via a first USB connection; receiving a second digital audio data from a second host computing device via a second USB connection; detecting a sample rate and a bit depth for each of the first and second digital audio data; converting the sample rate and bit depth of the first digital audio data to match the sample rate and bit depth of the second digit audio data, respectively, when the sample rate and bit rate of the first digital audio data are different than the sample rate and bit rate of the second digital audio data, respectively; determining a digital rights attribute associated with the first digital audio data; applying a digital rights management rule to the first digital audio data according to the digital rights attribute; and sending the first digital audio data to the second host computing device when there is no conflict with a digital rights management rule.

The audio pass-through devices and methods described herein provide several advantages over state of the art devices and methods. First, devices are capable of passing digital audio data between multiple hosted computing devices with different audio properties such as bit depth and sample rate while maintaining low-to-no transfer latency. This is due, in part, to the fact that digital audio data streams do not need to be converted to analog. Second, the devices simply the number of components and processes by eliminating the need for analog conversion and by making host computing devices interconnective via their USB ports. Third, the devices are capable of aggregating input signals from a variety of different sources, including USB hosting to USB audio devices, internal CODECs, Ethernet audio protocols such as Audio Video Bridging (AVB) and other audio interface protocols. Fourth, the devices are capable of audio matrix mixing for either direct audio pass-through from one input audio channel to an output audio channel or a unique summation of several input audio channels into each audio output channel. Fifth, the devices seamlessly integrate conventional Digital Rights Management practices. Sixth, the devices are flexible and can handle other digital communication protocols such as digital video.

The numerous advantageous aspects of the inventive devices and processes described herein can be further illustrated by way of two examples. In the first example, a musician wishes to use multiple computing devices during a live performance. Device 1000 allows the musician to play music stored on the different computing devices (in the form of digital audio data) directly into one output channel (e.g., audio speakers), without having to convert the digital data to analog and without having to copy or transfer audio files from one device onto another device. The musician does not have to spend significant costs and time to synchronize the multiple computing devices—it is all done in one device (e.g., device 1000). In the second example, a musician wishes to compose a new song by aggregating different digital audio data from different computing devices. In particular, the musician has a MIDI keyboard connected to a desktop computer for recording sounds. The musician would like to use an iPad to further synthesize the sounds from the MIDI keyboard. Device 1000 allows the iPad to act as a virtual studio technology (VST) and can receive digital audio data from the desktop computer, synthesize the digital audio data, and return the synthesized digital audio data back to the desktop, without ever having to convert the digital audio data to analog. Device 1000 allows the musician to distribute processing tasks (e.g., VST) across multiple devices with little-to-no latency and while maintaining the quality of the original digital audio data stream.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A digital audio pass-through device for sharing digital audio data between at least two host computing devices via a USB connection, comprising:
    a first USB device port for communicatively coupling the digital audio pass-through device with a first host computing device via a first USB connection to receive a first digital audio data stream;
    a second USB device port for communicatively coupling the digital audio pass-through device with a second host computing device via a second USB connection to receive a second digital audio data stream;
    a first non-USB device port; and
    a high speed digital audio gateway engine comprising a processor, a non-transitory electronic storage medium, and a set of executable instructions stored in the non-transitory electronic storage medium, wherein the set of executable instructions is configured to direct the first digital audio data stream and the second digital audio data stream and wherein the set of executable instructions includes a synchronization module configured to synchronize the first digital audio data stream with the second digital data audio stream and an audio signal from the non-USB device port.

2. The device of claim 1, wherein the non-USB device port is selected from the group consisting of Ethernet, DVI, HDMI, VGA, DFP, S-Video, RCA, TRS, XLR, S/PDIF, coaxial, F connector, and Mini DVI.

3. The device of claim 1, wherein the first non-USB device port uses a communication protocol type selected from the group consisting of CODEC and Audio Video Bridging (AVB).

4. The device of claim 1, wherein the synchronization module is configured to synchronize the first digital audio data stream with at least one of (i) the second digital data audio stream and (ii) an audio signal from the non-USB device port by converting a sample rate of the first digital audio data stream.

5. The device of claim 1, wherein the set of executable instructions includes a sample rate module and a bit depth module.

6. The device of claim 5, wherein the sample rate module is configured to determine a sample rate of the first digital audio data stream and wherein the bit depth module is configured to determine a bit depth of the first digital audio data stream.

7. The device of claim 6, wherein the sample rate module is further configured to convert the sample rate of the first digital audio data stream to match a sample rate of the second digital audio data stream when the two are different, and wherein the bit depth module is further configured to convert the bit depth of the first digital audio data stream to match a bit depth of the second digital audio data stream when the two are different.

8. The device of claim 1, wherein the set of executable instructions includes a digital rights management module configured to (i) determine a digital right attribute for the first digital audio data stream, and (ii) apply a digital rights management rule to the first digital audio data stream.

9. The device of claim 1, wherein the set of executable instructions includes a matrix mixer module configured to apply a first level to the first digital audio data stream and a second level to the second digital audio data stream.

10. The device of claim 9, wherein the matrix mixer module is further configured to aggregate the first and second digital audio data streams after applying the first and second levels, respectively, to thereby produce an aggregated digital audio data stream.

11. The device of claim 10, wherein the matrix mixer module is further configured to send the aggregated digital audio data stream to an output device.

12. The device of claim 11, wherein the output device is at least one of the first host computing device and the second host computing device.

13. A method of sharing a digital audio signal between multiple host computing devices across a USB connection, comprising the steps of:
    receiving a first digital audio data stream from a first host computing device via a first USB device port;
    receiving a second digital audio data stream from a second host computing device via a second USB device port;
    receiving an audio signal from a non-USB device port,
    synchronizing the first digital audio data stream with the second digital audio data stream and the audio signal from the non-USB device port; and
    sending the first digital audio data stream to the second host computing device.

14. The method of claim 13, further comprising the steps of:
    detecting a sample rate and a bit depth for each of the first and second digital audio data streams;
    converting the sample rate and bit depth of the first digital audio data stream to match the sample rate and bit depth of the second digit audio data stream, respectively, when the sample rate and bit rate of the first digital audio data stream are different than the sample rate and bit rate of the second digital audio data stream, respectively;
    determining a digital rights attribute associated with the first digital audio data stream; and
    applying a digital rights management rule to the first digital audio data stream according to the digital rights attribute.

15. The method of claim 14, further comprising the steps of:
    applying a first level to the first digital audio data stream to produce a level-modified first digital audio data stream; and
    applying a second level to the second digital audio data stream to produce a level-modified second digital audio data stream.

16. The method of claim 15, further comprising the step of aggregating the level-modified first digital audio data stream and the level-modified second digital audio data stream to produce an aggregated digital audio data stream.

17. The method of claim 16, further comprising the step of sending the aggregated digital audio data stream to an output device.

18. A digital audio pass-through device for sharing digital audio data between at least two host computing devices via a USB connection, comprising:
    a first USB device port for communicatively coupling the digital audio pass-through device with a first host computing device via a first USB connection to receive a first digital audio data stream;

a second USB device port for communicatively coupling the digital audio pass-through device with a second host computing device via a second USB connection to receive a second digital audio data stream; and a high speed digital audio gateway engine comprising a processor, a non-transitory electronic storage medium, and a set of executable instructions stored in the non-transitory electronic storage medium, wherein the set of executable instructions is configured to:

direct the first digital audio data stream and the second digital audio data stream;

determine a sample rate of the first digital audio data stream; and determine a bit depth of the first digital audio data stream.

* * * * *